United States Patent
Tomura et al.

(10) Patent No.: US 10,202,516 B2
(45) Date of Patent: Feb. 12, 2019

(54) PRINTED MATTER, PRINTER, AND PRINTING METHOD

(71) Applicants: Tatsuya Tomura, Tokyo (JP);
Yoshimasa Miyazawa, Kanagawa (JP);
Takuya Fujita, Kanagawa (JP)

(72) Inventors: Tatsuya Tomura, Tokyo (JP);
Yoshimasa Miyazawa, Kanagawa (JP);
Takuya Fujita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/784,583

(22) Filed: Oct. 16, 2017

(65) Prior Publication Data

US 2018/0118966 A1   May 3, 2018

(30) Foreign Application Priority Data

Nov. 2, 2016  (JP) .................................. 2016-215582
Sep. 14, 2017  (JP) .................................. 2017-176903

(51) Int. Cl.

| G01D 11/00 | (2006.01) |
|---|---|
| B41J 2/17 | (2006.01) |
| C09D 11/38 | (2014.01) |
| B41M 5/382 | (2006.01) |
| C08K 5/17 | (2006.01) |
| C09D 11/322 | (2014.01) |
| C09D 11/102 | (2014.01) |
| C08K 3/08 | (2006.01) |
| B41M 5/50 | (2006.01) |

(52) U.S. Cl.
CPC ......... *C09D 11/38* (2013.01); *B41M 5/38278* (2013.01); *C08K 5/17* (2013.01); *C09D 11/102* (2013.01); *C09D 11/322* (2013.01); *B41M 5/502* (2013.01); *C08K 2003/0806* (2013.01)

(58) Field of Classification Search
CPC ..... C09D 11/38; C09D 11/102; C09D 11/322; B41M 5/0023; B41M 5/0035
USPC .................................. 347/95, 100, 101, 105
See application file for complete search history.

(56) References Cited

U.S. PATENT DOCUMENTS

| 6,786,586 B2* | 9/2004 | Koga .................. B41M 5/0035 |
|---|---|---|
| | | 347/100 |
| 7,938,525 B2* | 5/2011 | Kawakami .......... B41M 5/0023 |
| | | 347/100 |
| 8,517,528 B2* | 8/2013 | Sano ....................... B41J 3/407 |
| | | 347/100 |

FOREIGN PATENT DOCUMENTS

| JP | 11-302587 | 11/1999 |
|---|---|---|
| JP | 2004-207558 | 7/2004 |
| JP | 2006-299329 | 11/2006 |
| JP | 2007-194174 | 8/2007 |
| JP | 2007-297423 | 11/2007 |
| JP | 2011-052041 | 3/2011 |
| JP | 2011-241242 | 12/2011 |
| WO | WO2006/112031 A1 | 10/2006 |

* cited by examiner

*Primary Examiner* — An Do
(74) *Attorney, Agent, or Firm* — Oblon, McClelland, Maier & Neustadt, L.L.P.

(57) ABSTRACT

A printed matter is provided. The printed matter comprises a print medium and a print layer on the print medium. The print medium comprises a porous layer having an average pore diameter of from 100 to 400 nm and an average thickness of from 1 to 50 μm. The print layer comprises silver and an aliphatic compound having amino group and hydroxyl group, and has an average thickness of from 50 to 300 nm.

16 Claims, 2 Drawing Sheets

PRINTED MATTER, PRINTER, AND PRINTING METHOD

CROSS-REFERENCE TO RELATED APPLICATIONS

This patent application is based on and claims priority pursuant to 35 U.S.C. § 119(a) to Japanese Patent Application Nos. 2016-215582 and 2017-176903, filed on Nov. 2, 2016 and Sep. 14, 2017, respectively, in the Japan Patent Office, the entire disclosure of each of which is hereby incorporated by reference herein.

BACKGROUND

Technical Field

The present disclosure relates to a printed matter, a printer, and a printing method.

Description of the Related Art

Print media have become more diverse recently. Varieties of print media are widely used in many fields, such as office printing, commercial printing, and large-scale printing.

Printed matters on such print media are capable of expressing full-color images by mixing multiple colors. However, although the printed matters have high specular image clarity, the high specular image clarity cannot be maintained for a long period of time.

Printed mater having metallic luster, particularly printed matter containing a silver colorant having high specular image clarity, is capable of providing images having high image clarity by mixing the silver colorant with other colorants. Such a printed matter has high potential in industrial use.

SUMMARY

In accordance with some embodiments of the present invention, a printed matter is provided. The printed matter comprises a print medium and a print layer on the print medium. The print medium comprises a porous layer having an average pore diameter of from 100 to 400 nm and an average thickness of from 1 to 50 μm. The print layer comprises silver and an aliphatic compound having amino group and hydroxyl group, and has an average thickness of from 50 to 300 nm.

In accordance with some embodiments of the present invention, a printer is provided. The printer includes a print medium, an ink, and a print layer former. The print medium comprises a porous layer having an average pore diameter of from 100 to 400 nm and an average thickness of from 1 to 50 μm. The ink comprises silver particles and an aliphatic compound having amino group and hydroxyl group. The print layer former is configured to apply the ink onto the print medium to form a print layer thereon.

In accordance with some embodiments of the present invention, a printing method is provided. The printing method includes the steps of: forming a print layer having an average thickness of from 50 to 300 nm on a print medium with an ink to form a printed matter. The print medium comprises a porous layer having an average pore diameter of from 100 to 400 nm and an average thickness of from 1 to 50 μm. The ink comprises silver particles and an aliphatic compound having amino group and hydroxyl group.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
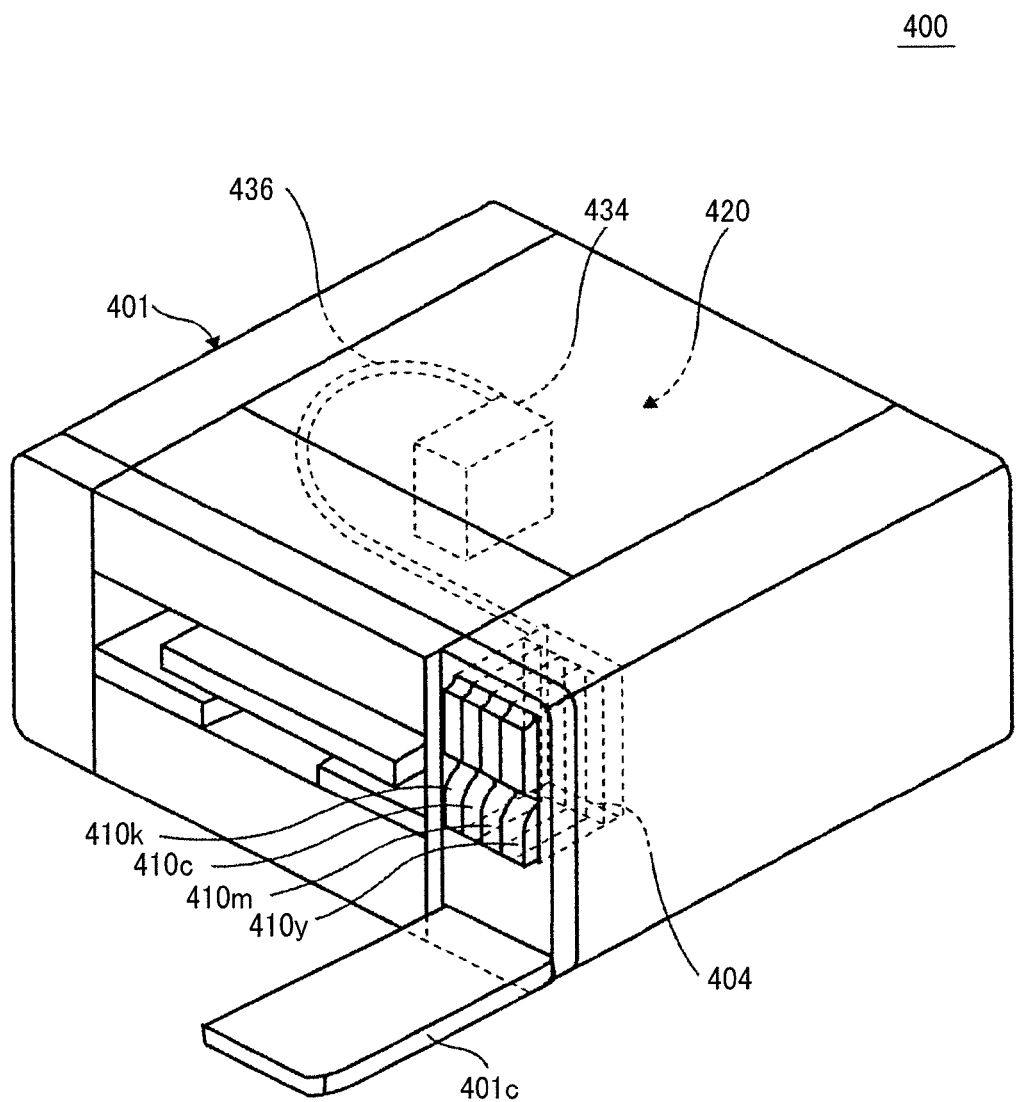
FIG. 1 is a perspective view of a serial-type image forming apparatus in accordance with some embodiments of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a printed matter having a silver-color print layer and high image clarity is provided.

Printed Matter

In accordance with some embodiments of the present invention, a printed matter is provided that comprises a print medium and a print layer on the print medium. The print medium comprises a porous layer having an average pore diameter of from 100 to 400 nm and an average thickness of from 1 to 50 μm. The print layer comprises silver and an aliphatic compound having amino group and hydroxyl group. The print layer has an average thickness of from 50 to 300 nm.

The printed matter is achieved based on the finding that printed matters formed with conventional inks are poor in image clarity.

Print Layer

The print layer comprises silver and an aliphatic compound having amino group and hydroxyl group.

The print layer has an average thickness of from 50 to 300 nm, preferably from 80 to 250 nm. When the average thickness is in the range of from 50 to 300 nm, a print surface having silver color and high image clarity can be obtained. The print surface here refers to a surface of the print layer. When the average thickness is 50 nm or more, brown color derived from plasmon absorption of metal particles (silver particles) is suppressed and a print surface having silver color and high image clarity can be obtained. When the average thickness is 300 nm or less, the porous layer can immediately absorb or adsorb an ink containing silver particles to prevent brown color of the silver particles appearing on the print surface, thus suppressing reddish color. Thus, a print surface having silver color and high image clarity can be obtained.

The average thickness of the print layer can be measured by cutting the printed matter in a vertical direction and observing the cross-sectional surface with a microscope such as optical microscope, laser microscope, scanning electron microscope (SEM), or transmission electron microscope (TEM).

Preferably, the print layer has an image clarity value of from 5 or more, more preferably 30 or more. In addition, preferably, the image clarity value is 98 or less.

The image clarity value is measured based on a method according to the specification of JIS (Japanese Industrial Standards) H 8686-2.

In the method, an image clarity measuring instrument composed of an optical device and a measuring device is used to measure an image clarity value C. The optical device detects, through a moving optical comb, reflected light (at a light receiving angle of 45 degrees) from a measurement target surface to which light has been directed through a slit at an incident angle of 45 degrees. The measuring device memorizes the detected light quantity as waveform. The image clarity C can be determined from the following formula based on the varying waveform of the light quantity detected through the optical comb.

$$C(n)=[(M-m)/(M+m)]\times 100$$

In the formula, C(n) represents an image clarity value (%), M represents a maximum wave height, and m represents a minimum wave height, when the optical comb width is n (mm). In the present disclosure, an image clarity meter ICM-1 (available from Suga Test Instruments Co., Ltd.) can be used as the image clarity measuring instrument, and the optical comb width is set to 2.0 mm.

Preferably, the print layer has a $b^*$ value of from −7 to 4, for securing a print surface having high image clarity and silver color. As the $b^*$ value becomes more minus, bluish color becomes stronger. As the $b^*$ value becomes more plus, yellowish color becomes stronger. As yellowish color becomes stronger, the color of the ink approaches gold color. When the $b^*$ value exceeds +4, gold color strongly appears and the color tone becomes far from silver color. When the $b^*$ value falls below −7, bluish color becomes stronger and the color tone becomes darker and different from silver color. The $b^*$ value can be easily measured with a handy spectrophotometer (available from X-Rite).

The print layer may be formed with an ink.

The ink may comprise silver particles and an aliphatic compound having amino group and hydroxyl group. The ink may further contain optional components such as a dispersant polymer, an organic solvent, water, and a resin.

Silver Particles

The silver particles improve image clarity of the print layer.

Preferably, the silver particles have a number average particle diameter of from 15 to 100 nm, more preferably from 30 to 60 nm. When the number average particle diameter is 15 nm or more, the silver particles are prevented from entering into the print layer and being present at the lowermost surface of the printed matter. Thus, the print layer can well exhibit metallic luster without being adversely affected by the yellow color of nano silver particles. When the number average particle diameter is 100 nm or less, the ink can be reliably discharged without causing precipitation of the silver particles with time. The number average particle diameter can be measured by a laser diffraction particle size distribution analyzer. Specific examples of the laser diffraction particle size distribution analyzer include, but are not limited to, those employing a dynamic light scattering method, such as MICROTRACK UPA available from Nikkiso Co., Ltd.

The content rate of silver in the print layer is preferably from 70.0% to 99.0% by mass, and more preferably from 85.0% to 97.0% by mass. When the content rate of silver in the print layer is from 70.0% to 99.0% by mass, metallic luster is developed.

The content rate of silver particles in the ink is preferably from 1.0% to 15.0% by mass, and more preferably from 2.5% to 10% by mass. When the content rate of silver particles in the ink is 1.0% by mass or more, metallic luster is developed. When the content rate of silver particles in the ink is 15.0% by mass or less, storage stability and discharge stability of the ink are improved.

Preferably, the silver particles in the ink are silver colloids, to the surface of which protection colloids are adhered, dispersed in an aqueous dispersion medium. In this case, the silver particles can be well dispersed in the aqueous dispersion medium, thus drastically improving storage stability of the ink.

The silver colloids can be prepared by, for example, reducing silver ions in a solution with a reducing agent in the presence of protection colloids, as described in JP-2006-299329-A.

In this method, dispersion stability of the silver particles can be more improved by adding a surfactant to the solution at any time before and after the reduction reaction.

The protection colloids comprise an organic matter capable of protecting the surfaces of silver particles. Specific examples of such organic matters include, but are not limited to, carboxyl-group-containing organic compounds and polymeric dispersants. Each of these materials can be used alone or combination with others. Combinations are more preferable for their synergistic effects.

Carboxyl-Group-Containing Organic Compounds

The number of carboxyl groups in one molecule of the carboxyl-group-containing organic compound is at least one, preferably from 1 to 10, more preferably from 1 to 5, and most preferably from 1 to 3.

A part or all of the carboxyl groups in the carboxyl-group-containing organic compound may form a salt (e.g., amine salt, metal salt). In particular, organic compounds in which most carboxyl groups are not forming salts, i.e., organic compounds containing free carboxyl groups, are preferable. More particularly, organic compounds in which all the carboxyl groups are not forming salts (e.g., amine salts) with a basic compound (e.g., amine) are preferable.

The carboxyl-group-containing organic compound may further contain functional groups (including ligand groups for metallic compounds or metallic nano particles) other than carboxyl group.

Examples of such functional groups (including ligand groups) other than carboxyl group include, but are not limited to, groups containing at least one hetero atom selected from halogen atoms (e.g., fluorine atom, chlorine atom, bromine atom, iodine atom), nitrogen atom, oxygen atom, and sulfur atom. Specific examples of such groups include, but are not limited to: nitrogen-atom-containing groups, such as amino group, substituted amino groups (e.g., dialkylamino group), imino group (—NH—), nitrogen ring groups (e.g., 5-membered to 8-membered nitrogen ring group such as pyridyl group; carbazole group; morpholinyl group), amide group (—CON<), cyano group, and nitro group; oxygen-atom-containing groups, such as hydroxyl group, alkoxy groups (e.g., C1-C6 alkoxy groups such as methoxy group, ethoxy group, propoxy group, and butoxy group), formyl group, carbonyl group (—CO—), ester group (—COO—), and oxygen ring groups (e.g., 5-membered to 8-membered oxygen ring groups such as tetrahydropyranyl group): sulfur-atom-containing groups, such as thio group, thiol group, thiocarbonyl group (—SO—), alkylthio groups (e.g., C1-C4 alkylthio groups such as methylthio group and ethylthio group), sulfo group, sulfamoyl group, and sulfinyl group (—$SO_2$—); and these groups forming a salt (e.g., ammonium salt group). Each of these functional groups may be contained in the carboxyl-group-containing organic compound alone or in combination with others.

Preferably, the carboxyl-group-containing organic compound contain no basic group capable of forming a salt with carboxyl group, such as amino group, substituted amino group, imino group, and ammonium salt group.

Examples of the carboxyl-group-containing organic compound include carboxylic acids.

Examples of carboxylic acids include, but are not limited to, monocarboxylic acids, polycarboxylic acids, and hydroxycarboxylic acids (or oxycarboxylic acids).

Specific examples of the monocarboxylic acids include, but are not limited to, aliphatic monocarboxylic acids and aromatic monocarboxylic acids. Specific examples of the aliphatic monocarboxylic acids include, but are not limited to, saturated aliphatic monocarboxylic acids (e.g., C1-C34 aliphatic monocarboxylic acids such as acetic acid, propionic acid, butyric acid, caprylic acid, caproic acid, hexanoic acid, capric acid, lauric acid, myristic acid, cyclohexane carboxylic acid, dehydrocholic acid, and cholanic acid, preferably C1-C30 aliphatic monocarboxylic acids) and unsaturated aliphatic monocarboxylic acids (e.g., C4-C34 unsaturated aliphatic monocarboxylic acids such as oleic acid, erucic acid, linoleic acid, and abietic acid, preferably C10-C30 unsaturated aliphatic monocarboxylic acids). Specific examples of the aromatic monocarboxylic acids include, but are not limited to, C7-C12 aromatic monocarboxylic acids such as benzoic acid and naphthoic acid.

Specific examples of the polycarboxylic acids include, but are not limited to, aliphatic polycarboxylic acids and aromatic polycarboxylic acids. Specific examples of the aliphatic polycarboxylic acids include, but are not limited to, aliphatic saturated polycarboxylic acids (e.g., C2-C14 aliphatic saturated polycarboxylic acids such as oxalic acid, malonic acid, succinic acid, glutaric acid, adipic acid, azelaic acid, sebacic acid, and cyclohexanedicarboxylic acid, preferably C2-C10 aliphatic saturated polycarboxylic acids) and aliphatic unsaturated polycarboxylic acids (e.g., C4-C14 aliphatic unsaturated polycarboxylic acids such as maleic acid, fumaric acid, itaconic acid, sorbic acid, and tetrahydrophthalic acid, preferably C4-C10 aliphatic unsaturated polycarboxylic acids). Specific examples of the aromatic polycarboxylic acids include, but are not limited to, C8-C12 aromatic polycarboxylic acids such as phthalic acid and trimellitic acid.

Specific examples of the hydroxycarboxylic acids include, but are not limited to, hydroxymonocarboxylic acids and hydroxypolycarboxylic acids. Specific examples of the hydroxymonocarboxylic acids include, but are not limited to, aliphatic hydroxymonocarboxylic acids (e.g., C2-C50 aliphatic hydroxymonocarboxylic acids such as glycolic acid, lactic acid, hydrobutyric acid, glyceric acid, 6-hydroxyhexanoic acid, cholic acid, deoxycholic acid, chenodeoxycholic acid, 12-oxochenodeoxycholic acid, glycocholic acid, lithocholic acid, hyodeoxycholic acid, ursodeoxycholic acid, apocholic acid, and taurocholic acid, preferably C2-C34 aliphatic hydroxymonocarboxylic acids, more preferably C2-C30 aliphatic hydroxymonocarboxylic acids) and aromatic hydroxymonocarboxylic acids (e.g., C7-C12 aromatic hydroxymonocarboxylic acids such as salicylic acid, oxybenzoic acid, and gallic acid). Specific examples of the hydroxypolycarboxylic acids include, but are not limited to, aliphatic hydroxypolycarboxylic acids (e.g., C2-C10 aliphatic hydroxypolycarboxylic acids such as tartronic acid, tartaric acid, citric acid, and malic acid).

The above carboxylic acids may be forming a salt, anhydride, or hydrate. In many cases, the carboxylic acids are not forming a salt (in particular a salt with a basic compound, such as an amine salt).

Each of the above carboxyl-group-containing organic compounds can be used alone or in combination with others.

Among the above carboxyl-group-containing organic compounds, hydroxycarboxylic acids such as aliphatic hydroxycarboxylic acids (e.g., aliphatic hydroxymonocarboxylic acids, aliphatic hydroxypolycarboxylic acids) are preferable.

Among the aliphatic hydroxycarboxylic acids, alicyclic hydroxycarboxylic acids (i.e., hydroxycarboxylic acids having an alicyclic backbone) are preferable.

Among the alicyclic hydroxycarboxylic acids (i.e., hydroxycarboxylic acids having an alicyclic backbone), C6-C34 alicyclic hydroxycarboxylic such as cholic acid is preferable, C10-C34 alicyclic hydroxycarboxylic acids are more preferable, and C16-C30 alicyclic hydroxycarboxylic acids are most preferable.

In particular, polycyclic aliphatic carboxylic acids (e.g., C10-C50 condensed polycyclic aliphatic carboxylic acids, preferably C12-C40 condensed polycyclic aliphatic carboxylic acids, more preferably C14-C34 condensed polycyclic aliphatic carboxylic acids, particularly C18-C30 condensed polycyclic aliphatic carboxylic acids) are preferable, because they have a bulky structure that effectively suppresses aggregation of silver particles. Examples of such polycyclic aliphatic carboxylic acids include: polycyclic aliphatic hydroxycarboxylic acids (e.g., condensed polycyclic aliphatic hydroxycarboxylic acids, preferably C10-C34 condensed polycyclic aliphatic hydroxycarboxylic acids, more preferably C14-C34 condensed polycyclic aliphatic hydroxycarboxylic acids, particularly C18-C30 condensed polycyclic aliphatic hydroxycarboxylic acids) such as cholic acid; and polycyclic aliphatic carboxylic acids (e.g., condensed polycyclic aliphatic carboxylic acids, preferably C10-C34 condensed polycyclic aliphatic carboxylic acids, more preferably C14-C34 condensed polycyclic aliphatic carboxylic acids, particularly C18-C30 condensed polycyclic aliphatic carboxylic acids) such as dehydrocholic acid and cholanic acid.

Preferably, the carboxyl-group-containing organic compound has a number average molecular weight of 1,000 or less (e.g., about 46 to 900), more preferably 800 or less (e.g., about 50 to 700), and most preferably 600 or less (e.g., about 100 to 500). Preferably, the carboxyl-group-containing organic compound has a pKa value of 1 or more (e.g., about 1 to 10), preferably 2 or more (e.g., about 2 to 8). The number average molecular weight can be measured by a gel permeation chromatographic (GPC) apparatus.

Polymeric Dispersant

The protection colloids may comprise a combination of the carboxyl-group-containing organic compound and a polymeric dispersant. In a case in which the protection colloids comprise such a combination, the silver colloids include a remarkably small number of coarse silver particles. In particular, by use of a specific combination of the the carboxyl-group-containing organic compound and a polymeric dispersant as the protection colloids, the proportion of silver particles in the silver colloids can be increased even though the amount of coarse silver particles is small, thereby improving storage stability of the silver colloids (and a liquid dispersion thereof).

The polymeric dispersant comprises a material capable of coating silver particles. Specific preferred examples of such a material include, but are not limited to, amphiphilic polymeric dispersants (including oligomer dispersants).

Specifically, polymeric dispersants generally used for dispersing colorants in the field of paints and inks can be used as the polymeric dispersant.

Specific examples of such polymeric dispersants include, but are not limited to, styrene resins (e.g., styrene-acrylic acid copolymer, styrene-methacrylic acid copolymer, styrene-maleic anhydride copolymer), acrylic resins (e.g., methyl acrylate-acrylic acid copolymer, methyl acrylate-methacrylic acid copolymer, methyl methacrylate-acrylic acid copolymer, methyl methacrylate-methacrylic acid copolymer), water-soluble urethane resins, water-soluble acrylic urethane resins, water-soluble epoxy resins, water-soluble polyester resins, cellulose derivatives (e.g., nitrocellulose; and cellulose ethers such as alkyl celluloses such as ethyl cellulose, alkyl hydroxyalkyl celluloses such as ethyl hydroxyethyl cellulose, hydroxyalkyl celluloses such as hydroxyethyl cellulose and hydroxypropyl cellulose, carboxyalkyl celluloses such as carboxymethyl cellulose), polyvinyl alcohols, polyalkylene glycols (e.g., liquid polyethylene glycol, polypropylene glycol), natural polymers (e.g., gelatin, dextrin), polyethylene sulfonates, and formalin condensates of naphthalenesulfonic acid. Each of these materials can be used alone or combination with others.

Examples of the amphiphilic polymeric dispersants include resins (including water-soluble resins and water-dispersible resins) containing a hydrophilic unit (or hydrophilic block) comprising a hydrophilic monomer.

Specific examples of the hydrophilic monomer include, but are not limited to: addition polymerizable monomers such as carboxyl-group-containing or acid-anhydride-containing monomers (e.g., acrylic or methacrylic monomers such as acrylic acid and methacrylic acid, unsaturated polycarboxylic acids such as maleic acid, maleic anhydride) and hydroxyl-group-containing monomers (e.g., hydroxyalkyl acrylates and methacrylates such as 2-hydroxyethyl acrylate and 2-hydroxyethyl methacrylate, vinyl phenol); and condensation polymerizable monomers such as alkylene oxides (e.g., ethylene oxide).

The condensation polymerizable monomer may form a hydrophilic unit through a reaction with an active group such as hydroxyl group (e.g., the hydroxyl-group-containing monomer).

Each of the above hydrophilic monomers may form a hydrophilic unit alone or in combination with others.

The polymeric dispersant includes at least a hydrophilic unit (or hydrophilic block). The polymeric dispersant may comprise either a homopolymer or copolymer of the above hydrophilic monomers (e.g., polyacrylic acid and a salt thereof). Alternatively, the polymeric dispersant may comprise a copolymer of a hydrophilic monomer and a hydrophobic monomer, such as the above-exemplified styrene resins and acrylic resins.

Specific examples of the hydrophobic monomer (i.e., non-ionic monomer) include, but are not limited to, acrylic and methacrylic monomers such as acrylates and methacrylates (e.g., C1-C20 alkyl acrylates and methacrylates such as methyl acrylate and methacrylate, ethyl acrylate and methacrylate, n-butyl acrylate and methacrylate, 2-ethyl hexyl acrylate and methacrylate, lauryl acrylate and methacrylate, and stearyl acrylate and methacrylate; cycloalkyl acrylates and methacrylates such as cyclohexyl acrylate and methacrylate; aryl acrylates and methacrylates such as phenyl acrylate and methacrylate; and aralkyl acrylates and methacrylates such as benzyl acrylate and methacrylate and 2-phenylethyl acrylate and methacrylate), styrene monomers (e.g., styrene, α-methylstyrene, vinyl toluene), olefin monomers (e.g., C2-C20 α-olefins such as ethylene, propylene, 1-butene, isobutylene, 1-hexene, 1-octene, 1-dodecene), and carboxylic acid vinyl ester monomers (e.g., vinyl acetate and vinyl butyrate). Each of these hydrophobic monomers may form a hydrophobic unit alone or in combination with others.

In a case in which the polymeric dispersant comprises a copolymer (e.g., a copolymer of a hydrophilic monomer and a hydrophobic monomer), the copolymer may be any of a random copolymer, an alternating copolymer, a block copolymer (e.g., a copolymer comprising a hydrophilic unit comprising a hydrophilic monomer and a hydrophobic unit comprising a hydrophobic monomer), and a comb-like copolymer (e.g., comb-like graft copolymer).

The block copolymer may take a diblock structure or a triblock structure (e.g., ABA type, BAB type).

With respect to the comb-like copolymer, the main chain thereof may comprise any of the hydrophilic unit, the hydrophobic unit, and both of the hydrophilic block and the hydrophobic block.

The hydrophilic unit may comprise a condensed block, such as a hydrophilic block comprising an alkylene oxide (e.g., ethylene oxide), such as a polyalkylene oxide (e.g., polyethylene oxide, polyethylene oxide-polypropylene oxide).

The hydrophilic block (e.g., polyalkylene oxide) and the hydrophobic block (e.g., polyolefin block) may be bound to each other via a linking group such as ester bond, amide bond, ether bond, and urethane bond.

Such a bond may be formed by modifying the hydrophobic block (e.g., polyolefin) with a modifying agent (e.g., unsaturated carboxylic acids and anhydrides thereof such as maleic acid and maleic anhydride; lactam; aminocarboxylic acid; hydroxylamine; diamine) and introducing the hydrophilic block thereto.

A comb-like copolymer (the main chain of which comprising the hydrophobic block) may be formed by reacting (or binding) a polymer obtained from a monomer containing a hydrophilic group such as hydroxyl group and carboxyl group (e.g., hydroxyalkyl acrylates and methacrylates) with the above-described condensation polymerizable hydrophilic monomer (e.g., ethylene oxide).

In addition, a hydrophilic non-ionic monomer can be copolymerized together for balancing hydrophilicity and hydrophobicity.

Specific examples of such copolymerizable components include, but are not limited to, monomers and oligomers comprising an alkyleneoxy unit (preferably ethyleneoxy unit), such as 2-(2-methoxyethoxy)ethyl acrylate, 2-(2- methoxyethoxy)ethyl methacrylate, and polyethylene glycol monomethacrylate (having a number average molecular weight of about 200 to 1,000).

Alternatively, the balance between hydrophilicity and hydrophobicity may be adjusted by modifying (e.g., esterifying) the hydrophilic group (e.g., carboxyl group).

The polymeric dispersant may contain a functional group.

Specific examples of the functional group include, but are not limited to, acid groups (e.g., acidic groups such as carboxyl group and acid anhydride group thereof and sulfo groups such as sulfonic acid group) and hydroxyl group. Each of these functional groups may be contained in the polymeric dispersant alone or in combination with others. In particular, the polymeric dispersant preferably contains an acid group, more preferably carboxyl group.

In a case in which the polymeric dispersant contains acid groups (e.g., carboxyl groups), a part or all of the acid groups (e.g., carboxyl groups) may form a salt (e.g., amine salt, metal salt). In particular, polymeric dispersants in which most acid groups (e.g., carboxyl groups) are not forming salts, i.e., polymeric dispersants containing free acid groups (e.g. carboxyl groups), are preferable. More particularly, polymeric dispersants in which all the acid groups (e.g., carboxyl groups) are not forming salts (e.g., amine salts) with a basic compound (e.g., amine) are preferable.

The polymeric dispersant having an acid group (preferably carboxyl group) may have an acid value of 1 mgKOH/g or more (e.g., about 2 to 100 mgKOH/g), preferably 3 mgKOH/g or more (e.g., about 4 to 90 mgKOH/g), more preferably 5 mgKOH/g or more (e.g., about 6 to 80 mgKOH/g), and most preferably 7 mgKOH/g or more (e.g., about 8 to 70 mgKOH/g). Typically, the acid value is in the range of from 3 to 50 mgKOH/g (e.g., about 5 to 30 mgKOH/g). The polymeric dispersant having an acid group may have an amine value of 0 mgKOH/g or substantially 0 mgKOH/g.

The positions of the functional groups in the polymeric dispersant are not limited. The functional groups may be present either in the main chain, a side chain, or both the main chain and a side chain of the polymeric dispersant.

The functional group may be of a functional group derived from a hydrophilic monomer or hydrophilic unit, such as hydroxyl group. The functional group may be introduced to the polymer by copolymerizing a copolymerizable monomer having the functional group, such as maleic anhydride. Each of the above polymeric dispersants may be used alone or in combination with others. Specific examples of the polymeric dispersant further include a polymeric pigment dispersant described in JP-2004-207558-A.

The polymeric dispersant is either commercially or synthetically available.

Specific examples of commercially-available polymeric dispersants (including amphiphilic dispersants) include, but are not limited to: SOLSPERSE series, such as SOLSPERSE 13240, SOLSPERSE 13940, SOLSPERSE 32550, SOLSPERSE 31845, SOLSPERSE 24000, SOLSPERSE 26000, SOLSPERSE 27000, SOLSPERSE 28000, and SOLSPERSE 41090, products of AVECIA GROUP; DISPERBYK series, such as DISPERBYK 160, DISPERBYK 161, DISPERBYK162, DISPERBYK 163, DISPERBYK 164, DISPERBYK 166, DISPERBYK 170, DISPERBYK 180, DISPERBYK 182, DISPERBYK 184, DISPERBYK 190, DISPERBYK 191, DISPERBYK 192, DISPERBYK 193, DISPERBYK 194, DISPERBYK 2001, and DISPERBYK 2050, products of BYK Japan KK; EFKA-46, EFKA-47, EFKA-48, EFKA-49, EFKA-1501, EFKA-1502, EFKA-4540, EFKA-4550, POLYMER 100, POLYMER 120, POLYMER 150, POLYMER 400, POLYMER 401, POLYMER 402, POLYMER 403, POLYMER 450, POLYMER 451, POLYMER 452, and POLYMER 453, products of BASF (formerly EFKA Chemicals); AJISPER series, such as AJISPER PB711, AJISPER PA111, AJISPER PB811, AJISPER PB821, and AJISPER PW911, products of Ajinomoto Co., Inc.; FLOWLEN series, such as FLOWLEN DOPA-158, FLOWLEN DOPA-22, FLOWLEN DOPA-17, FLOWLEN TG-700, FLOWLEN TG-720W, FLOWLEN-730W, FLOWLEN-740W, and FLOWLEN-745W, products of Kyoeisha Chemical Co., Ltd.; and Joncryl® series, such as Joncryl® 678, Joncryl® 679, and Joncryl® 62, products of BASF (formerly Johnson Polymer).

Among these polymeric dispersants, DISPERBYK 190 and DISPERBYK 194 each have an acid group.

Preferably, the polymeric dispersant has a number average molecular weight of from 1,500 to 100,000, more preferably from 2,000 to 80,000 (e.g., from 2,000 to 60,000), much more preferably from 3,000 to 50,000 (e.g., from 5,000 to 30,000), and most preferably from 7,000 to 20,000. The number average molecular weight can be measured by a gel permeation chromatographic (GPC) apparatus.

Silver colloid liquids are commercially available from a lot of manufacturers and are applicable to inks by the ink preparation method described above.

Aliphatic Compound having Amino Group and Hydroxyl Group

The aliphatic compound having amino group and hydroxyl group shows alkalinity and can be used as a pH adjuster.

Specific examples of the aliphatic compound having amino group and hydroxyl group include, but are not limited to, 2-amino-1,3-propanediol, 3-amino-1,2-propanediol, 2-amino-2-methyl-1,3-propanediol, 2-amino-2-ethyl-1,3-propanediol, 2-amino-2-hydroxymethyl-1,3-propanediol, 3-dimethylamino-1,2-propanediol, 1-methylamino-2,3-propanediol, triethanolamine, dimethylaminoethanol, diethanolamine, 2-aminoethanol, N-methylethanolamine, and diisopropanolamine. Each of these compounds may be used alone or in combination with others.

Ink

Compositional materials of the ink (e.g., organic solvent, water, colorant, resin, and other additives) are described in detail below.

Organic Solvent

There is no specific limitation on the type of the organic solvent. For example, water-soluble organic solvents are usable. Examples of water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, c-caprolactam, and y-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250° C. or less are preferable, since they can function as a wetting agent while providing good drying property.

In addition, polyol compounds having 8 or more carbon atoms and glycol ether compounds are also preferable. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In particular, the polyol compounds having 8 or more carbon atoms and the glycol ether compounds, exemplified above, are capable of improving paper-permeability of the ink, which is advantageous when the ink is printed on a recording medium made of paper.

Preferably, the content rate of the organic solvent in the ink is in the range of from 10% to 60% by mass, more preferably from 20% to 60% by mass, for drying property and discharge reliability of the ink.

Water

Water is a main medium for water-based inks. For reducing ionic impurities as much as possible, pure water such as ion-exchange water, ultrafiltration water, reverse osmosis water, and distilled water, and ultrapure water may be used as the medium of water-based inks. In addition, sterile water, sterilized by ultraviolet irradiation or addition of hydrogen peroxide, is preferably used for preventing generation of mold and bacteria during a long-term storage of the silver ink.

Preferably, the content rate of water in the ink is in the range of from 10% to 75% by mass, more preferably from 20% to 60% by mass, for reducing environmental load and further containing other components in the ink.

Resin

The resin improves abrasion resistance of the print layer and adhesiveness thereof to the print medium.

Examples of the resin include, but are not limited to, water-soluble resins and water-dispersible resins. Each of these resins can be used alone or in combination with others. In particular, water-soluble resins are preferable.

Specific examples of the water-soluble resins include, but are not limited to, proteins (e.g., gelatin, casein), natural rubbers (e.g., gum arabic), glucosides (e.g., saponin), cellulose derivatives (e.g., methyl cellulose, carboxym ethyl cellulose, hydroxymethyl cellulose), lignosulfonate, natural polymers (e.g., shellac), polyacrylate, polyacrylamide, salts of styrene-acrylic acid copolymers, salts of vinylnaphthalene-acrylic acid copolymers, salts of styrene-maleic acid copolymers, salts of vinylnaphthalene-maleic acid copolymers, sodium salts of β-naphthalenesulfonic acid formalin condensates, ionic polymers (e.g., polyphosphoric acid), polyvinyl alcohol, polyvinyl butyral, polyethylene glycol, polypropylene glycol, polyethylene oxide, polyvinyl methyl ether, and polyethyleneimine.

Specific examples the water-dispersible resins include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

These resins may be in the form of particles (hereinafter "resin particles"). The resin particles may be dispersed in water to become a resin emulsion. The ink can be obtained by mixing the resin emulsion with other materials such as colorant and organic solvent. These resin particles are available either synthetically or commercially. The resin particles may include one type or two or more types of resin particles.

The content rate of the resin in the ink is preferably in the range of from 0.1% to 15.0% by mass, preferably from 0.1% to 10.0% by mass, and more preferably from 0.3% to 4.0% by mass. When the content rate is from 0.1% to 15.0% by mass, the resin can sufficiently exhibit its function to provide excellent abrasion resistance and metallic luster.

The content rate of the resin in the print layer is preferably in the range of from 0.1% to 15.0% by mass, and more preferably from 1.0% to 10.0% by mass. When the content rate is from 0.1% to 15% by mass, the resin can sufficiently exhibit its function to provide excellent abrasion resistance and metallic luster.

Additives

The ink may further contain a surfactant, a defoamer, a preservative, a fungicide, a corrosion inhibitor, and/or a pH adjuster, if necessary.

Surfactant

Usable surfactants include silicone-based surfactants, fluorine-based surfactants, ampholytic surfactants, nonionic surfactants, and anionic surfactants.

The silicone-based surfactants have no specific limit and can be suitably selected to suit to a particular application. Preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property, which is preferable. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

These surfactants are available either synthetically or commercially. Commercial products are readily available from BYK Japan KK, Shin-Etsu Chemical Co., Ltd., Dow Corning Toray Co., Ltd., Nihon Emulsion Co., Ltd., and Kyoeisha Chemical Co., Ltd.

Specific examples of the polyether-modified silicone-based surfactants include, but are not limited to, a compound represented by the following formula (S-1) that is a dimethylpolysiloxane having a polyalkylene oxide structure on its side chain bonded to Si atom.

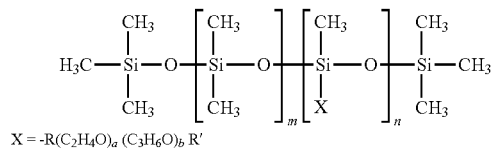

Formula (S-1)

X = -R(C₂H₄O)ₐ(C₃H₆O)ᵦ R'

In the formula (S-1), each of m, n, a, and b independently represents an integer, R represents an alkylene group, and R' represents an alkyl group. Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Mom entive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain. Among these fluorine-based surfactants, polyoxyalkylene ether polymer compounds having a perfluoroalkyl ether group on its side chain are preferable since foaming property thereof is small. More specifically, compounds represented by the following formula (F-1) and (F-2) are preferable.

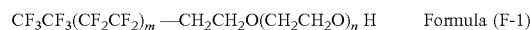

$CF_3CF_3(CF_2CF_2)_m$—$CH_2CH_2O(CH_2CH_2O)_n$ H    Formula (F-1)

In the formula (F-1), m is preferably an integer ranging from 0 to 10, and n is preferably an integer ranging from 0 to 40, to give water-solubility to the compound.

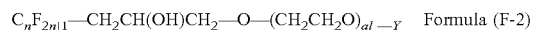

$C_nF_{2n+1}$—$CH_2CH(OH)CH_2$—O—$(CH_2CH_2O)_{al}$—Y    Formula (F-2)

In the formula (F-2), Y represents H, $C_mF_{2m+1}$ (where m represents an integer of from 1 to 6), $CH_2CH(OH)CH_2$—$C_mF_{2m+1}$ (where m represents an integer of from 4 to 6), or $C_pF_{2p+1}$ (where p represents an integer of from 1 to 19); n represents an integer of from 1 to 6; and a represents an integer of from 4 to 14.

The fluorine-based surfactants are available either synthetically or commercially.

Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from Sumitomo 3M Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.). Among these, for improving printing quality, in particular color developing property, paper permeability, paper wettability, and uniform dying property, FS-3100, FS-34, and FS-300 (available from The Chemours Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

Preferably, the content rate of the surfactant in the ink is in the range of from 0.001% to 5% by mass, more preferably from 0.05% to 5% by mass, for improving wettability, discharge stability, and image quality.

Defoamer

Specific examples of the defoamer include, but are not limited to, silicone defoamers, polyether defoamers, and fatty acid ester defoamers. Each of these defoamers can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH

Preferably, the ink has a pH of from 7.0 to 10.0 at 25° C. for ink stability. When the pH is from 7.0 to 10.0, the ink can maintain high quality for an extended period of time. It is also preferable that the ink has a pH of from 7.0 to 10.0 for preventing corrosion of metallic members of the printer that contacts the ink.

The pH can be adjusted by adding the aliphatic compound having amino group and hydroxyl group to the ink.

The pH can be measured by a pH electrode at room temperature (25° C.). The pH can also be measured by a pH measuring instrument equipped with a glass electrode serving as a single lot measuring cell, such as pH METER MODEL HM-30 (product of DKK-TOA CORPORATION).

The aliphatic compound having amino group and hydroxyl group in the print layer in the printed matter can be analyzed by extracting the ink from the print layer (solid phase) into an organic solvent and analyzing the extracted ink by GC/MS.

Print Medium

The print medium has a porous layer on its surface.

The porous layer has no limit so long as it absorbs ink constituents other than colorants, such as water, without absorbing silver particles in the ink. For example, the print medium may have pores capable of absorbing liquid constituents of the ink.

Preferably, the porous layer has an average pore diameter of from 100 to 400 nm, more preferably from 150 to 300 nm. When the average pore diameter is from 100 to 400 nm, liquid constituents of the silver-particles-containing ink are effectively absorbed in the porous layer and a print surface having high image clarity and silver color can be obtained.

The average pore diameter of the porous layer can be measured by cutting the print medium in a print surface direction or vertical direction and observing the cross-sectional surface with a microscope such as optical microscope, laser microscope, scanning electron microscope (SEM), or transmission electron microscope (TEM).

Preferably, the porous layer has an average thickness of from 1 to 50 μm, more preferably from 5 to 30 μm. When the average thickness is from 1 to 50 μm, liquid constituents of the silver-particles-containing ink are effectively absorbed in the porous layer and a print surface having high image clarity and silver color can be obtained.

The average thickness of the porous layer can be measured by cutting the print medium in a print surface direction or vertical direction and observing the cross-sectional surface with a microscope such as optical microscope, laser microscope, scanning electron microscope (SEM), or transmission electron microscope (TEM).

The porous layer is preferably made of a porous material capable of forming a uniform film on paper or resin substrates (e.g., polyethylene terephthalate (PET), vinyl chloride) with high adhesiveness and safety.

Specific examples of such a porous material include, but are not limited to, silica and alumina. Each of these materials can be used alone or in combination with others.

Commercially-available printing media already having a porous layer comprising silica and/or alumina may be used as the print medium. Non-absorptive or poorly-absorptive recording media may also be used after a porous layer is formed thereon by applying a coating liquid containing alumina and/or silica thereto.

The porous layer can be formed from a commercially-available silica or alumina coating material in a sol or gel state.

In the coating material, silica or alumina may have a spherical shape. Spherical particles may be connected into a rosary-like shape or a branched shape (e.g., a chain-like shape, a pearl-necklace-like shape).

The surface of the coating material may be modified with an ion or compound, such as ammonia, calcium, and alumina.

Specific examples of the silica coating material include, but are not limited to: SNOWTEX® series S, N, UP, ST-XS, ST-O, ST-C, and ST-20 (available from Nissan Chemical Industries, Ltd.); CATALOID series SI-350, SI-30, SN, SA, S-20L, S-20H, S-30L, and S-30H (available from JGC Catalysts and Chemicals Ltd.); and AEROSIL® series 200, 200V, 200CF, and 300 (available from Nippon Aerosil Co., Ltd.). Specific examples of the alumina coating material include, but are not limited to, ALUMINA CLEAR SOL 5S, F1000, F3000, and A2 (available from Kawaken Fine Chemicals Co., Ltd.). Each of these materials can be used alone or in combination with others.

The porous layer can be formed by, for example, blade coating, gravure coating, bar coating, roll coating, dip coating, curtain coating, slide coating, die coating, or spray coating.

Commercially-available print media having the porous layer can be used as the print medium. Specific examples of such commercially-available print media having the porous layer include, but are not limited to; IJ FILM RM-1GP01 (having an average pore diameter of 230 nm) available from Ricoh Co., Ltd.; NB-WF-3GF100 (having an average pore diameter of 210 nm) and NB-RC-3GR120 (having an average pore diameter of 250 nm), available from Mitsubishi Paper Mills Limited; PT-201A420 (having an average pore diameter of 270 nm), SD-101A450 (having an average pore diameter of 250 nm), GL-101A450 (having an average pore diameter of 240 nm), GP501A450 (having an average pore diameter of 250 nm), SP-101A450 (having an average pore diameter of 210 nm), PT-101A420 (having an average pore diameter of 240 nm), and PR101 (having an average pore diameter of 270 nm), available from Canon Inc.; EJK-QTNA450 (having an average pore diameter of 200 nm), EJK-EPNA450 (having an average pore diameter of 210 nm), EJK-CPNA450 (having an average pore diameter of 220 nm), EJK-RCA450 (having an average pore diameter of 240 nm), EJK-OGNA450 (having an average pore diameter of 190 nm), EJK-GANA450 (having an average pore diameter of 180 nm), EJK-NANA450 (having an average pore diameter of 170 nm), and EJK-EGNA450 (having an average pore diameter of 200 nm), available from ELECOM CO., LTD.; WPA455VA (having an average pore diameter of 200 nm), WPA450PRM (having an average pore diameter of 210 nm), G3A450A (having an average pore diameter of 220 nm), and WPA420HIC (having an average pore diameter of 280 nm), available from FUJIFILM Corporation; KA420SCKR (having an average pore diameter of 240 nm), KA450PSKR (having an average pore diameter of 230 nm), and KA450SLU (having an average pore diameter of 210 nm), available from SEIKO EPSON CORPORATION; and BP71GAA4 (having an average pore diameter of 220 nm) available from Brother Industries, Ltd.

Resin Layer

Preferably, the resin layer is disposed on the print layer.

The resin layer preferably contains a resin having high transparency.

Specific examples of such a resin include, but are not limited to, polyethylene terephthalate (PET) resin, polypropylene (PP) resin, and nylon.

The print surface or printed matter as a whole is preferably coated with the resin by a laminate treatment.

Alternatively, an overcoat treatment is also preferred in which a water or solvent solution of a transparent resin is applied to the print surface or printed matter.

The resin layer can be formed by, for example, blade coating, gravure coating, bar coating, roll coating, dip coating, curtain coating, slide coating, die coating, or spray coating.

Preferably, the resin layer has an average thickness of from 5 to 300 μm, considering the b* value of the printed matter coated with the resin layer.

If only the ink is directly printed on the print medium, abrasion resistance of the resulting printed matter will be poor because of mere deposition of silver pigments on the print medium. If the silver pigments comprise silver nanoparticles, the color tone of the printed matter will be unnatural silver color. If a resin ink containing no colorant is printed first and thereafter the ink containing silver particles is printed thereon, abrasion resistance will be improved to some extent but still insufficient, and the color tone will be unnatural silver color. To solve these problems and improve abrasion resistance, a transparent resin layer may be formed on the print layer.

The following description is based on a case in which black, cyan, magenta, and yellow inks are used, where each of the ink is replaceable with the ink containing silver particles.

Recording Device and Recording Method

The ink according to an embodiment of the present invention can be suitably applied to various recording devices employing an inkjet recording method, such as printers, facsimile machines, photocopiers, multifunction peripherals (having the functions of printer, facsimile machine, and photocopier), and three-dimensional objects manufacturing devices.

In the present disclosure, the recording device and the recording method respectively represent a device capable of discharging inks or various treatment liquids to a recording medium and a method for recording an image on the recording medium using the device. The recording medium refers to an article to which the inks or the various treatment liquids can be attached at least temporarily.

The recording device may further optionally include devices relating to feeding, conveying, and ejecting of the recording medium and other devices referred to as a pretreatment device or an aftertreatment device, in addition to the ink discharger.

The recording device may further optionally include a heater for use in the heating process and a dryer for use in the drying process. Examples of the heater and the dryer include devices for heating and drying the printed surface and the reverse surface of a recording medium. Specific examples of the heater and the drier include, but are not limited to, a fan heater and an infrared heater. The heating process and the drying process may be performed either before, during, or after printing.

In addition, the recording device and the recording method are not limited to those producing merely meaningful visible images such as texts and figures with the ink. For example, the recording device and the recording method can produce patterns like geometric design and three-dimensional images.

The recording device includes both a serial type device in which the discharge head is caused to move and a line type device in which the discharge head is not moved.

Furthermore, in addition to the desktop type, the recording device includes a device capable of printing images on a large recording medium with A0 size and a continuous printer capable of using continuous paper reeled up in a roll form as recording media.

Figure 2:
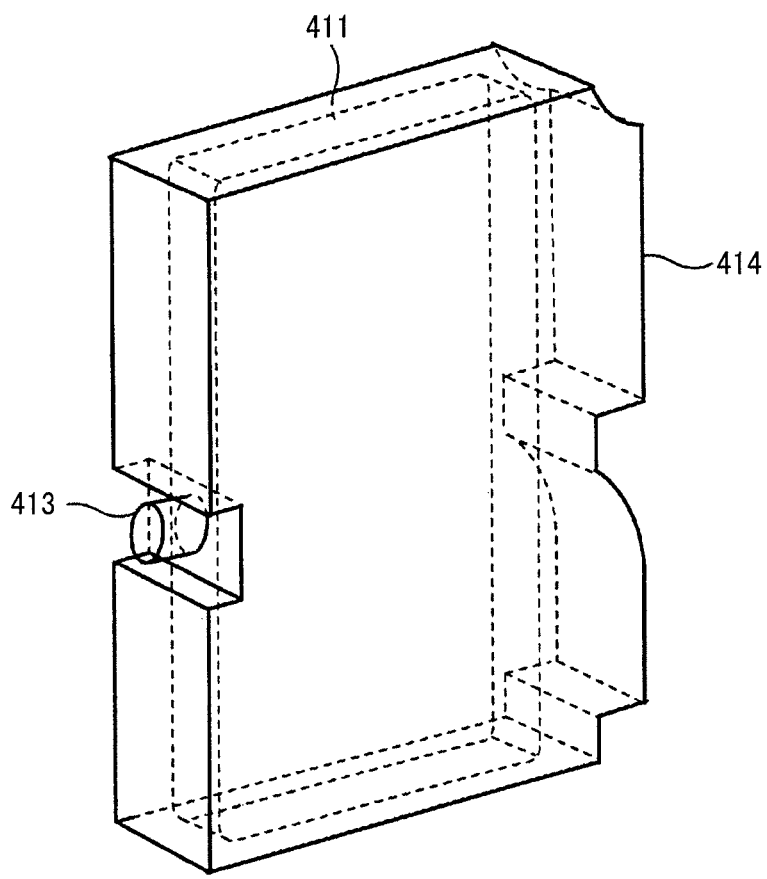
FIG. 2 is a perspective view of a main tank for use in the image forming apparatus illustrated in FIG. 1.

As one example of the recording device according to an embodiment of the present invention, an image forming apparatus 400 is described in detail below with reference to FIGS. 1 and 2. FIG. 1 is a perspective view of an image forming apparatus 400. FIG. 2 is a perspective view of a main tank for use in the image forming apparatus 400. The image forming apparatus 400 is a serial-type image forming apparatus. A mechanical unit 420 is disposed in a housing 401 of the image forming apparatus 400. Main tanks 410k, 410c, 410m, and 410y for respective color of black (K), cyan (C), magenta (M), and yellow (Y) (hereinafter collectively referred to as "main tank 410") each include an ink container 411. Each ink container 411 is made of a packaging member such as an aluminum laminate film. The ink container 411 is accommodated in a container casing 414 made of plastic. As a result, the main tank 410 is used as an ink cartridge of each color.

A cartridge holder 404 is disposed on the rear side of the opening when a cover 401c is opened. The main tank 410 is detachably attachable to the cartridge holder 404. As a result, each ink discharging outlet 413 of the main tank 410 communicates with a discharge head 434 for each color via a supplying tube 436 for each color so that the ink can be discharged from the discharge head 434 to a recording medium.

The recording device according to an embodiment of the present invention may further optionally include a pretreatment device and/or an aftertreatment device, in addition to the ink discharger.

As an example, the pretreatment device and the aftertreatment device may be provided as a liquid discharger including a liquid container containing the pretreatment or aftertreatment liquid and a liquid discharge head to discharge the pretreatment or aftertreatment liquid by inkjet recording method, having a similar configuration to the liquid discharger for each of the black (K), cyan (C), magenta (M), and yellow (Y) inks.

As another example, the pretreatment device and the aftertreatment device may be provided as a device employing a method other than inkjet recording method, such as blade coating, roll coating, or spray coating.

The ink may be applied not only to inkjet recording method but also to other methods in various fields. Specific examples of such methods other than inkjet recording method include, but are not limited to, blade coating methods, gravure coating methods, bar coating methods, roll coating methods, dip coating methods, curtain coating methods, slide coating methods, die coating methods, and spray coating methods.

The recording device (or printer) according to some embodiments of the present invention includes a print medium, an ink, and a print layer former configured to apply the ink onto the print medium to form a print layer thereon. The ink comprises silver particles and an aliphatic compound having amino group and hydroxyl group. The print medium comprises a porous layer having an average pore diameter of from 100 to 400 nm and an average thickness of from 1 to 50 μm. The recording device (or printer) preferably further includes a resin coater.

The recording method (or printing method) according to some embodiments of the present invention includes the step of forming a print layer having an average thickness of from 50 to 300 nm on a print medium with an ink to form a printed matter, where the print medium comprises a porous layer having an average pore diameter of from 100 to 400 nm and an average thickness of from 1 to 50 μm, and the ink comprises silver particles and an aliphatic compound having amino group and hydroxyl group.

The content rate of silver particles in the ink is preferably from 1.0% to 15.0% by mass, and more preferably from 2.5% to 10% by mass. When the content rate of silver particles in the ink is 1.0% by mass or more, metallic luster is developed. When the content rate of silver particles in the ink is 15.0% by mass or less, storage stability and discharge stability of the ink are improved.

Preferably, the ink has a pH of from 7.0 to 10.0 at 25° C. for ink stability. The pH can be measured by a pH measuring instrument equipped with a glass electrode serving as a single lot measuring cell, such as pH METER MODEL HM-30 (product of DKK-TOA CORPORATION).

The print medium used for the above-described printed matter may be used for the printer and printing method.

The ink used for the above-described printed matter may be used for the printer and printing method.

Examples of the print layer former configured to apply the ink onto the print medium include, but are not limited to, a discharge head.

In the step of forming a print layer, the ink is printed on the print medium. This step of forming a print layer is preferably performed by an inkjet method.

The resin coater has no limit so long as the print medium can be coated with the resin.

In the present disclosure, "image forming", "recording", and "printing" are treated as synonymous terms.

Set of Print Medium and Ink

In accordance with some embodiments of the present invention, a set of a print medium and an ink is provided. The print medium comprises a porous layer having an average pore diameter of from 100 to 400 nm and an average thickness of from 1 to 50 μm. The ink comprises silver particles and an aliphatic compound having amino group and hydroxyl group. The silver particles may account for 1.0% to 15.0% by mass of the ink, and the ink may have a pH of from 7.0 to 10.0 at 25° C.

The print medium used for the above-described printed matter may be used for the set.

The ink used for the above-described printed matter may be used for the set.

EXAMPLES

Further understanding can be obtained by reference to certain specific examples which are provided herein for the purpose of illustration only and are not intended to be limiting.

The pH of the ink and the average thicknesses of the print layer and porous layer of the printed matter were measured as follows.

Measurement of pH

The pH of the ink was measured with a pH METER MODEL HM-30 (product of DKK-TOA CORPORATION) at 25° C.

Measurement of Average Thickness of Print/Porous Layer

The average thickness of each of the print layer and porous layer was measured by cutting the printed matter in a vertical direction and observing the cross-sectional surface with a scanning electron microscope (SEM).

Silver Particle Dispersion Liquid Preparation Example

First, 66.8 g of silver nitrate, 7.2 g of a polymeric dispersant having carboxyl group (DISPERBYK 190 available from BYK Japan KK, containing water as the solvent and 40% by mass of non-volatile components, having an acid value of 10 mgKOH/g and an amine value of 0 mgKOH/g), and 1.8 g of cholic acid (available from Wako Pure Chemical Industries, Ltd.) were poured in 100 g of ion-exchange water and vigorously stirred, thus obtaining a suspension liquid. Next, 15 g of triethylamine (available from Tokyo Chemical Industry Co., Ltd.) was gradually added to the suspension liquid while keeping its temperature at 50° C. or less, and thereafter heat-stirred in a water bath at 50° for 3 hours, thus obtaining a reaction liquid. The reaction liquid was filtered with a glass filter (ADVANTEC GC-90 having a pore size of 0.8 μm), thus obtaining a silver particle dispersion liquid containing 20% by mass of silver particles.

The silver particle dispersion liquid was observed with a transmission electron microscope (available from JEOL Ltd.) to measure particle diameter of the silver particles. As a result, the number average particle diameter of primary particles was 50 nm.

Ink Preparation Example 1

Preparation of Ink 1

First, 50.0% by mass of the silver particle dispersion liquid prepared above, 0.5% by mass of 2,4,7,9-tetramethyldecane-4,7-diol (available from Tokyo Chemical Industry Co., Ltd.), 18.0% by mass of 1,2-propanediol (available from Tokyo Chemical Industry Co., Ltd.), 8.0% by mass of 3-ethyl-3-hydroxymethyloxetane (available from Tokyo Chemical Industry Co., Ltd.), 0.1% by mass of a preservative and fungicide PROXEL LV (available from AVECIA GROUP), and ion-exchange water in a residual amount such that the total percentage became 100% by mass were stir-mixed and thereafter filtered with a 0.2-μm polypropylene filter (SYRINGE FILTER available from Sartorius AG). Thus, an ink 1 was prepared.

Ink Preparation Examples 2 to 4

Preparation of Inks 2 to 4

The procedure in Ink Preparation Example 1 was repeated except for changing the composition according to the formulations described in Table 1, thus preparing inks 2 to 4.

Ink Preparation Example 5

Preparation of Ink 5

First, 5.0% by mass of a silver nano colloid (H-1 available from Mitsubishi Materials Corporation, having a silver particle concentration of 20% by mass), 0.5% by mass of 2,4,7,9-tetramethyldecane-4,7-diol (available from Tokyo Chemical Industry Co., Ltd.), 35.0% by mass of 1,2-propanediol (available from Tokyo Chemical Industry Co., Ltd.), 19.0% by mass of 3-ethyl-3-hydroxymethyloxetane (available from Tokyo Chemical Industry Co., Ltd.), 0.1% by mass of a preservative and fungicide PROXEL LV (available from AVECIA GROUP), and ion-exchange water in a residual amount such that the total percentage became 100% by mass were stir-mixed and thereafter filtered with a 0.2-μm polypropylene filter (SYRINGE FILTER available from Sartorius AG). Thus, an ink 5 was prepared.

Ink Preparation Example 6

Preparation of Ink 6

The procedure in Ink Preparation Example 5 was repeated except for changing the composition according to the formulation described in Table 1, thus preparing an ink 6.

TABLE 1

| | | Inks | | | | | |
|---|---|---|---|---|---|---|---|
| | | 1 | 2 | 3 | 4 | 5 | 6 |
| Silver Particles | Silver Particle Dispersion Liquid | 50.0 | 12.5 | 4.0 | 80.0 | — | — |
| | Silver Nano Colloid | — | — | — | — | 5.0 | 75.0 |
| Organic Solvent | 2,4,7,9-Tetramethyldecane-4,7-diol | 0.5 | 0.5 | 0.5 | 0.5 | 0.5 | 0.5 |
| | 1,2-Propanediol | 18.0 | 30.0 | 35.0 | 6.0 | 35.0 | 6.0 |
| | 3-Ethyl-3-hydroxymethyloxetane | 8.0 | 19.0 | 20.0 | 3.0 | 19.0 | 4.0 |
| Preservative and Fungicide | PROXEL LV | 0.1 | 0.1 | 0.1 | 0.1 | 0.1 | 0.1 |
| Water | Ion-exchange Water | Residual Amount | Residual Amount | Residual Amount | Residual Amount | Residual Amount | Residual Amount |
| Total (% by mass) | | 100 | 100 | 100 | 100 | 100 | 100 |
| Silver Particle Concentration in Ink (% by mass) | | 10.0 | 2.5 | 0.8 | 16.0 | 1.0 | 15.0 |

Ink Preparation Example 7

Preparation of Ink 7

An ink 7 was prepared by adding an appropriate amount of diethanolamine to the ink 1 so that the pH became 9.0.

Ink Preparation Examples 8 to 12

Preparation of Inks 8 to 12

The procedure in Ink Preparation Example 7 was repeated except for changing the added components and pH according to Table 2, thus preparing inks 8 to 12.

TABLE 2

| | | Base Ink No. | Added Components | pH |
|---|---|---|---|---|
| Inks | 7 | Ink 1 | Diethanolamine | 9.0 |
| | 8 | Ink 1 | Diethanolamine | 10.0 |
| | 9 | Ink 1 | Diethanolamine | 10.2 |
| | 10 | Ink 1 | Diethanolamine/Acetic Acid (Mass ratio = 3/1) | 8.8 |
| | 11 | Ink 1 | Diethanolamine/Acetic Acid (Mass ratio = 3/1) | 7.0 |
| | 12 | Ink 1 | Acetic Acid | 6.9 |

The product names and manufacturers of the materials described in Table 2 are listed below.

Diethanolamine: Tokyo Chemical Industry Co., Ltd.

Acetic acid: Wako Pure Chemical Industries, Ltd.

Ink Preparation Examples 13 to 18

Preparation of Inks 13 to 18

The procedure in Ink Preparation Example 7 was repeated except for replacing the ink 1 with the ink 2 and changing the added components and pH according to Table 3, thus preparing inks 13 to 18.

TABLE 3

| | | Base Ink No. | Added Components | pH |
|---|---|---|---|---|
| Inks | 13 | Ink 2 | 2-Amino-2-methyl-1,3-propanediol | 9.0 |
| | 14 | Ink 2 | 2-Amino-2-methyl-1,3-propanediol | 10.0 |
| | 15 | Ink 2 | 2-Amino-2-methyl-1,3-propanediol | 10.2 |
| | 16 | Ink 2 | 2-Amino-2-methyl-1,3-propanediol/Acetic Acid (Mass ratio = 3/1) | 8.8 |
| | 17 | Ink 2 | 2-Amino-2-methyl-1,3-propanediol/Acetic Acid (Mass ratio = 1/1) | 7.0 |
| | 18 | Ink 2 | Acetic Acid | 6.9 |

The product names and manufacturers of the materials described in Table 3 are listed below.

2-Amino-2-methyl-1,3-propanediol: Tokyo Chemical Industry Co., Ltd.

Acetic acid: Wako Pure Chemical Industries, Ltd.

Ink Preparation Examples 19 to 23

Preparation of Inks 19 to 23

The procedure in Ink Preparation Example 7 was repeated except for replacing the ink 1 with the ink 5 and changing the added components and pH according to Table 4, thus preparing inks 19 to 23.

TABLE 4

| | | Base Ink No. | Added Components | pH |
|---|---|---|---|---|
| Inks | 19 | Ink 5 | 2-Amino-2-hydroxymethyl-1,3-propanediol | 10.0 |
| | 20 | Ink 5 | 2-Amino-2-hydroxymethyl-1,3-propanediol | 10.2 |
| | 21 | Ink 5 | 2-Amino-2-hydroxymethyl-1,3-propanediol/Acetic Acid (Mass Ratio = 3/1) | 8.9 |

TABLE 4-continued

| | Base Ink No. | Added Components | pH |
|---|---|---|---|
| 22 | Ink 5 | 2-Amino-2-hydroxymethyl-1,3-propanediol/ Acetic Acid (Mass Ratio = 3/1) | 7.1 |
| 23 | Ink 5 | Acetic Acid | 6.8 |

The product names and manufacturers of the materials described in Table 4 are listed below.

2-Amino-2-hydroxymethyl-1,3-propanediol: Tokyo Chemical Industry Co., Ltd.

Acetic acid: Wako Pure Chemical Industries, Ltd.

Ink Preparation Examples 24 to 28

Preparation of Inks 24 to 28

The procedure in Ink Preparation Example 7 was repeated except for replacing the ink 1 with the ink 6 and changing the added components and pH according to Table 5, thus preparing inks 24 to 28.

TABLE 5

| | | Base Ink No. | Added Components | pH |
|---|---|---|---|---|
| Inks | 24 | Ink 6 | Diisopropanolamine | 9.9 |
| | 25 | Ink 6 | Diisopropanolamine | 10.4 |
| | 26 | Ink 6 | Diisopropanolamine/Acetic Acid (Mass Ratio = 4/1) | 8.7 |
| | 27 | Ink 6 | Diisopropanolamine/Acetic Acid (Mass Ratio = 4/1) | 7.3 |
| | 28 | Ink 6 | Acetic Acid | 6.9 |

The product names and manufacturers of the materials described in Table 5 are listed below.

Diisopropanolamine: Tokyo Chemical Industry Co., Ltd.
Acetic acid: Wako Pure Chemical Industries, Ltd.

Alumina-based Porous Print Medium Preparation Example 1

Preparation of Alumina-based Porous Print Medium M11

ALUMINA CLEAR SOL A2 (available from Kawaken Fine Chemicals Co., Ltd.) was mixed with 1% by mass of a surfactant FS34 (available from E. I. du Pont de Nemours and Company) to prepare a mixture liquid. The mixture liquid was formed into a film on a vinyl chloride resin (AVERY 3000 available from Avery Dennison Japan) by wire bar coating so that the average thickness of the dried film became 1 μm. Thus, an alumina-based porous print medium M11 was prepared. The surface thereof was observed with a scanning electron microscope (SEM) and the average pore diameter was determined to be 400 nm.

Alumina-based Porous Print Medium Preparation Example 2

Preparation of Alumina-based Porous Print Medium M12

The procedure in Alumina-based Porous Print Medium Preparation Example 1 was repeated except for changing the average thickness of the dried film to 0.3 μm. Thus, an alumina-based porous print medium M12 was prepared. The surface thereof was observed with a scanning electron microscope (SEM) and the average pore diameter was determined to be 400 nm.

Silica-based Porous Print Medium Preparation Example 1

Preparation of Silica-based Porous Print Medium M13

SNOWTEX® UP (available from Nissan Chemical Industries, Ltd.) was mixed with 1% by mass of a surfactant FS34 (available from E. I. du Pont de Nemours and Company) to prepare a mixture liquid. The mixture liquid was formed into a film on OK TOP COAT paper (available from Oji Paper Co., Ltd.) by wire bar coating so that the average thickness of the dried film became 5.0 μm. Thus, a silica-based porous print medium M13 was prepared. The surface thereof was observed with a scanning electron microscope (SEM) and the average pore diameter was determined to be 100 nm.

Silica-based Porous Print Medium Preparation Example 2

Preparation of Silica-based Porous Print Medium M14

The procedure in Silica-based Porous Print Medium Preparation Example 1 was repeated except for changing the average thickness of the dried film to 0.5 μm. Thus, a silica-based porous print medium M14 was prepared. The surface thereof was observed with a scanning electron microscope (SEM) and the average pore diameter was determined to be 100 nm.

The average pore diameter and average thickness of the porous layer of each print medium are shown in Table 6. M1 to M10 and M15 are commercially-available products.

TABLE 6

| | | Type of Print Media | Average Pore Diameter of Porous Layer (nm) | Average Thickness of Porous Layer (μm) |
|---|---|---|---|---|
| Print Media | M1 | Gloss Paper for InkJet (KASSAI SHASHIN-SHIAGE Pro WPA460PRO from FUJIFILM Corporation) | 300 | 30.0 |
| | M2 | Gloss Paper for Inkjet (PLUTINUM PHOTO-GRAPH PAPER EJK-QTA420 from ELECOM Co., Ltd.) | 200 | 15.0 |
| | M3 | Gloss Paper for InkJet (PICTORICO PHOTO PAPER PPR200-A4/20 from Pictorico) | 300 | 20.0 |
| | M4 | Gloss Paper for InkJet (CANON PHOTO PAPER, GLOSSY PROFESSIONAL [PLATINUM GRADE] PT-201 from Canon Inc.) | 200 | 20.0 |
| | M5 | Vinyl Chloride Sheet (Avery3000 from Avery Dennison Japan) | — | — |
| | M6 | Plain Paper (My Paper from Ricoh Co., Ltd.) | 20,000 | 95.0 |
| | M7 | Gloss Paper for InkJet (QP from Konica Minolta, Inc.) | 20 | 20.0 |
| | M8 | Semigloss Paper (MC from Seiko Epson Corporation) | 10 | 15.0 |

TABLE 6-continued

| | Type of Print Media | Average Pore Diameter of Porous Layer (nm) | Average Thickness of Porous Layer (μm) |
|---|---|---|---|
| M9 | Gloss Film (from Seiko Epson Corporation) | — | — |
| M10 | OHP Film (from HP Inc.) | 40 | 25.0 |
| M11 | Alumina-based Porous Print Medium | 400 | 1.0 |
| M12 | Alumina-based Porous Print Medium | 400 | 0.3 |
| M13 | Silica-based Porous Print Medium | 100 | 5.0 |
| M14 | Silica-based Porous Print Medium | 100 | 0.5 |
| M15 | Inkjet Film (RM-1GP01 from Ricoh Co., Ltd.) | 230 | 15.0 |

It is to be noted that M5 and M9 each have no porous layer.

Measurement of Rate of Change of Ink Viscosity

The inks 2, 3, and 7 to 28 were contained in respective ink storage containers and stored in a thermostatic chamber at 50° C. for 500 hours. The viscosity of each ink was measured with a viscometer (RE80 MODEL L available from Toki Sangyo Co., Ltd.) before and after the storage. The rate of change of viscosity was calculated based on the following formula (1). The smaller the rate of change of viscosity, the better the storage stability. With respect to the inks 12 and 28, it was not able to calculate the rate of change of viscosity because these inks tuned into a gel through the storage. The evaluation results are shown in Table 7.

Rate of Change of Viscosity (%)=[{(Viscosity After Storage)−(Viscosity Before Storage)}/(Viscosity Before Storage)]×100    Formula (1)

Example 1

The print medium M2 was coated with the ink 7 before being stored in the thermostatic chamber at 50° C. for 500 hours by wire bar coating to form a print layer having an average wet thickness of 2μm. Thus, a printed matter formed with the ink 7 before storage was obtained. Another printed matter was also formed with the ink 7 after being stored in the thermostatic chamber at 50° C. for 500 hours.

Examples 2 to 14 and Comparative Examples 1 to 10

The procedure in Example 1 was repeated except for replacing the ink 7 with another ink according to Table 7. Thus, printed matters formed with each ink before and after storage were obtained.

The rate of change of image clarity of each printed matter was evaluated as follows. The evaluation results are shown in Table 7.

Measurement of Rate of Change of Image Clarity

Each printed matter formed with each ink before or after storage was subjected to a measurement of image clarity at 2 mm according to JIS H8686-2 using an image clarity meter ICT-1T (available from Suga Test Instruments Co., Ltd.). The rate of change of image clarity was calculated based on the following formula (2). With respect to the printed matters formed with the ink 3 before and after storage in Comparative Example 9, it was not able to measure the rate of change of image clarity. The evaluation results are shown in Table 7.

Rate of Change of Image Clarity (%)=[{(Image Clarity Value of Printed Matter formed with Ink After Storage)−(Image Clarity Value of Printed Matter formed with Ink Before Storage)}/(Image Clarity Value of Printed Matter formed with Ink Before Storage)]×100    Formula (2)

TABLE 7

| | | Ink | | | | Print | Evaluation Results | |
|---|---|---|---|---|---|---|---|---|
| | | No. | Ink pH | Content Rate of Silver Particles (% by mass) | Print Medium | Printing Method | Print Layer Average Thickness (nm) | Rate of Change of Ink Viscosity (%) | Rate of Change of Image Clarity (%) |
| Examples | 1 | Ink 7 | 9.0 | 10.0 | M2 | Wire Bar | 200 | +0.8 | −4 |
| | 2 | Ink 8 | 10.0 | 10.0 | M2 | Wire Bar | 200 | +0.6 | −5 |
| | 3 | Ink 10 | 8.8 | 10.0 | M2 | Wire Bar | 200 | +0.7 | −3 |
| | 4 | Ink 11 | 7.0 | 10.0 | M2 | Wire Bar | 200 | +0.6 | −3 |
| | 5 | Ink 13 | 9.0 | 2.5 | M2 | Wire Bar | 80 | +0.7 | −1 |
| | 6 | Ink 14 | 10.0 | 2.5 | M2 | Wire Bar | 80 | +0.8 | −2 |
| | 7 | Ink 16 | 8.8 | 2.5 | M2 | Wire Bar | 80 | +0.8 | −4 |
| | 8 | Ink 17 | 7.0 | 2.5 | M2 | Wire Bar | 80 | +0.9 | −3 |
| | 9 | Ink 19 | 10.0 | 1.0 | M2 | Wire Bar | 50 | +1.5 | −2 |
| | 10 | Ink 21 | 8.9 | 1.0 | M2 | Wire Bar | 50 | +1.2 | 0 |
| | 11 | Ink 22 | 7.1 | 1.0 | M2 | Wire Bar | 50 | +0.7 | −1 |
| | 12 | Ink 24 | 9.9 | 15.0 | M2 | Wire Bar | 280 | +1.4 | −2 |
| | 13 | Ink 26 | 8.7 | 15.0 | M2 | Wire Bar | 300 | +1.0 | 0 |
| | 14 | Ink 27 | 7.3 | 15.0 | M2 | Wire Bar | 300 | +1.0 | −2 |
| Comparative Examples | 1 | Ink 9 | 10.2 | 10.0 | M2 | Wire Bar | 200 | +7.8 | −18 |
| | 2 | Ink 12 | 6.9 | 10.0 | M2 | Wire Bar | — | — | — |
| | 3 | Ink 15 | 10.2 | 2.5 | M2 | Wire Bar | 100 | +7.4 | −17 |
| | 4 | Ink 18 | 6.9 | 2.5 | M2 | Wire Bar | 100 | +18.4 | −25 |
| | 5 | Ink 20 | 10.2 | 1.0 | M2 | Wire Bar | 50 | +5.4 | −11 |
| | 6 | Ink 23 | 6.8 | 1.0 | M2 | Wire Bar | 50 | +10.8 | −14 |

TABLE 7-continued

|  |  | Ink |  |  | Print | Evaluation Results | |
|---|---|---|---|---|---|---|---|
|  |  | Content Rate of Silver |  |  | Layer Average | Rate of Change of Ink | Rate of Change of Image |
| No. | Ink pH | Particles (% by mass) | Print Medium | Printing Method | Thickness (nm) | Viscosity (%) | Clarity (%) |
| 7 Ink 25 | 10.4 | 15.0 | M2 | Wire Bar | 300 | +23.8 | −27 |
| 8 Ink 28 | 6.9 | 15.0 | M2 | Wire Bar | — | — | — |
| 9 Ink 3 | 7.6 | 0.8 | M2 | Wire Bar | 49 | +0.8 | — |
| 10 Ink 4 | 7.6 | 16.0 | M2 | Wire Bar | 301 | +9.8 | −16 |

Example 15

A printer IPSIO SG 3100 (available from Ricoh Co., Ltd.) was filled with the ink 7. The ink was applied to a 50-mm-square area on the print medium M1 by ink-jetting to form a print layer having an average thickness of 160 nm after being dried. Thus, a printed matter having a 100% solid image was obtained.

Examples 16 to 26 and Comparative Examples 11 to 22

The procedure in Example 15 was repeated except for changing the ink, print medium, printing method, and average thickness of the print layer according to Table 8. The wire bar coating was performed by a product No. 0.1 (available from RK PrintCoat Instruments Ltd) for forming a film having an average wet thickness of 2 μm. In Comparative Example 22, it was not able to discharge the ink.

Image clarity and b* value of each printed matter was evaluated as follows. The evaluation results are shown in Table 8.

Measurement of Image Clarity

Each printed matter was subjected to a measurement of image clarity at 2 mm according to JIS H8686-2 using an image clarity meter ICT-1T (available from Suga Test Instruments Co., Ltd.).

Measurement of b* Value

Each printed matter was subjected to a measurement of b* value with a handy spectrophotometer (available from X-Rite Inc.).

Printed matters having a b* value of from −7 to +4 are practically applicable.

TABLE 8

|  |  | Ink | Print Medium | Printing Method | Print Layer Average Thickness (nm) | Porous Layer | | Evaluation Results | |
|---|---|---|---|---|---|---|---|---|---|
|  |  |  |  |  |  | Average Pore Diameter (nm) | Average Thickness (μm) | Image Clarity | b* Value |
| Examples | 15 | Ink 7 | M1 | Inkjet | 160 | 300 | 30 | 58 | +1.3 |
|  | 16 | Ink 8 | M2 | Inkjet | 160 | 200 | 15 | 55 | +1.1 |
|  | 17 | Ink 10 | M3 | Inkjet | 160 | 300 | 20 | 48 | +0.8 |
|  | 18 | Ink 11 | M4 | Inkjet | 160 | 200 | 20 | 53 | +1.1 |
|  | 19 | Ink 13 | M1 | Inkjet | 150 | 300 | 30 | 51 | +0.7 |
|  | 20 | Ink 14 | M2 | Inkjet | 60 | 200 | 15 | 48 | +1.2 |
|  | 21 | Ink 16 | M3 | Inkjet | 50 | 300 | 20 | 44 | +1.0 |
|  | 22 | Ink 17 | M4 | Inkjet | 150 | 200 | 20 | 52 | −0.8 |
|  | 23 | Ink 19 | M11 | Inkjet | 100 | 400 | 1 | 7 | −1.8 |
|  | 24 | Ink 22 | M13 | Inkjet | 100 | 100 | 5 | 8 | −1.4 |
|  | 25 | Ink 26 | M1 | Wire Bar | 51 | 300 | 30 | 60 | +1.0 |
|  | 26 | Ink 27 | M2 | Wire Bar | 300 | 200 | 15 | 55 | +1.3 |
| Comparative Examples | 11 | Ink 13 | M3 | Wire Bar | 305 | 300 | 20 | 3 | +4.8 |
|  | 12 | Ink 14 | M4 | Wire Bar | 380 | 200 | 20 | 2 | +5.0 |
|  | 13 | Ink 16 | M5 | Inkjet | 200 | — | — | 3 | +5.0 |
|  | 14 | Ink 17 | M6 | Inkjet | 8 | 20,000 | 95 | 1 | +14.8 |
|  | 15 | Ink 13 | M7 | Inkjet | 180 | 20 | 20 | 4 | +4.6 |
|  | 16 | Ink 13 | M8 | Inkjet | 190 | 10 | 15 | 4 | +4.8 |
|  | 17 | Ink 7 | M9 | Inkjet | 210 | — | — | 3 | +5.0 |
|  | 18 | Ink 8 | M10 | Inkjet | 170 | 40 | 25 | 4 | +4.6 |
|  | 19 | Ink 7 | M12 | Inkjet | 220 | 400 | 0.3 | 3 | +4.7 |
|  | 20 | Ink 8 | M14 | Inkjet | 210 | 100 | 0.5 | 3 | +5.0 |
|  | 21 | Ink 3 | M1 | Inkjet | 100 | 300 | 30 | Unmeasurable | +4.7 |
|  | 22 | Ink 4 | M1 | Inkjet | — | 300 | 30 | — | — |

It is clear from Table 8 that image clarity and b* value are excellent when the average pore diameter and average thickness of the porous layer and the average thickness of the print layer are within the respective specified ranges.

Example 27

An inkjet printer (IPSIO SG 3100 available from Ricoh Co., Ltd.) was filled with the ink 7. A 100% solid image was printed on a 50-mm-square area on the print medium M15 (RM-1GP01 available from Ricoh Co., Ltd.). The print layer was laminate-coated with a polyethylene terephthalate resin (PET available from Tokyo Laminex Inc.) so that a resin layer having an average thickness of 50 μm was formed on the print layer.

Examples 28 to 32

The procedure in Example 27 was repeated except for replacing the PET with a polypropylene resin (PP available from Tokyo Laminex Inc.) and changing the average thickness of the resin layer according to Table 9. Thus, printed matters having a resin layer on the print layer were obtained.

Reference Examples 1 to 2

The procedure in Example 27 was repeated except for replacing the ink 7 with another ink according to Table 9 and eliminating the resin layer. Thus, printed matters having no resin layer were obtained.

Image clarity and b* value of each printed matters obtained in Examples 27 to 32 and Reference Examples 1 to 2 were evaluated as follows. The evaluation results are shown in Table 9.
Measurement of Image Clarity
Each printed matter was subjected to a measurement of initial image clarity at 2 mm according to JIS H8686-2 using an image clarity meter ICT-1T (available from Suga Test Instruments Co., Ltd.). The printed matter was thereafter exposed to an environment of 25° C. and 50% RH for 30 days and subjected to a measurement of image clarity after the exposure.
Measurement of b* Value
Each printed matter was subjected to a measurement of initial b* value with a handy spectrophotometer (available from X-Rite Inc.). The printed matter was thereafter exposed to an environment of 25° C. and 50% RH for 30 days and subjected to a measurement of b* value after the exposure.
Abrasion Resistance
Each printed matter after being dried was set in a Color Fastness Rubbing Tester AB-301 (available from TESTER SANGYO CO., LTD.) and rubbed 50 times with a friction element (with a load of 300 g), to the contact part of which a white cotton cloth (according to JIS L 0803) was attached. The degree of deterioration was visually observed to evaluate abrasion resistance based on the following criteria.
Evaluation Criteria
S: The number of flaws was 5 or less and the background (print medium) was invisible.
A: The number of flaws was more than 5 but the background (print medium) was invisible.
B: The number of flaws was more than 5 and most part of the background (print medium) was exposed.

TABLE 9

|  |  | Ink | Print Medium | Print Layer Average Thickness (nm) | Resin Layer | | Evaluation Results | | | | |
| --- | --- | --- | --- | --- | --- | --- | --- | --- | --- | --- | --- |
|  |  |  |  |  | Average Thickness (μm) | Resin Type | Image Clarity | | b* Value | | Abrasion Resistance |
|  |  |  |  |  |  |  | Initial | After Exposure | Initial | After Exposure |  |
| Examples | 27 | Ink 7 | M15 | 200 | 50 | PET | 55 | 54 | +2.3 | +2.5 | S |
|  | 28 | Ink 7 | M15 | 200 | 10 | PP | 57 | 58 | +1.9 | +1.9 | S |
|  | 29 | Ink 7 | M15 | 200 | 100 | PP | 58 | 57 | +2.8 | +3.3 | S |
|  | 30 | Ink 7 | M15 | 200 | 300 | PP | 51 | 51 | +3.0 | +3.2 | S |
|  | 31 | Ink 7 | M15 | 200 | 4 | PP | 60 | 59 | +1.5 | +1.5 | A |
|  | 32 | Ink 7 | M15 | 200 | 350 | PP | 49 | 49 | +4.0 | +4.2 | S |
| Reference Examples | 1 | Ink 7 | M15 | 200 | — | — | 60 | 40 | +1.1 | +1.2 | B |
|  | 2 | Ink 8 | M15 | 200 | — | — | 55 | 37 | +1.2 | +1.5 | B |

It is clear from Table 9 that abrasion resistance is improved when the print surface is coated with the resin layer. In addition, b* value and abrasion resistance are more improved when the average thickness of the resin layer is 10 μm or more.

Resin Dispersion Liquid Preparation Example 1

Preparation of Polyester-Urethane Resin Dispersion Liquid
After replacing the air in a vessel equipped with a thermometer, a nitrogen gas inlet tube, and a stirrer with nitrogen gas, 200.4 g of polyester polyol (PTMG1000 available from Mitsubishi Chemical Corporation, having an average molecular weight of 1,000), 15.7 g of 2,2-dimethylol propionic acid, 48.0 g of isophorone diisocyanate, and 77.1 g of methyl ethyl ketone (as an organic solvent) were reacted in the vessel in the presence of 0.06 g of dibutyltin dilaurate (DMTDL available from Tokyo Chemical Industry Co., Ltd.) as a catalyst. The reaction was continued for 4 hours and 30.7 g of methyl ethyl ketone (as a diluting solvent) was added to further continue the reaction. The reaction was continued for 6 hours in total. The reaction was terminated by adding 1.4 g of methanol. Thus, an organic solvent solution of a urethane resin was obtained. Next, 13.4 g of a 48% by mass aqueous solution of potassium hydroxide was added to the organic solvent solution of the urethane resin to neutralize carboxyl groups in the urethane resin. Further, 715.3 g of water was added thereto and sufficiently stirred, followed by aging and solvent removal. Thus, a polyester-urethane resin dispersion liquid was prepared that contains 30% by mass of resin particles based on solid contents.

Ink Preparation Example 29

Preparation of Ink 29

First, 25.0% by mass of the silver particle dispersion liquid prepared above, 0.5% by mass of 2,4,7,9-tetramethyldecane-4,7-diol (available from Tokyo Chemical Industry Co., Ltd.), 18.0% by mass of 1,2-propanediol (available from Tokyo Chemical Industry Co., Ltd.), 7.8% by mass of 3-ethyl-3-hydroxymethyloxetane (available from Tokyo Chemical Industry Co., Ltd.), 0.2% by mass of 2-amino-2-hydroxymethyl-1,3-propanediol (available from Tokyo Chemical Industry Co., Ltd.), 0.1% by mass of a preservative and fungicide PROXEL LV (available from AVECIA GROUP), 5.00% by mass of the polyester-urethane resin dispersion liquid, and ion-exchange water in a residual amount such that the total percentage became 100% by mass were stir-mixed and thereafter filtered with a 0.2-μm polypropylene filter (SYRINGE FILTER available from Sartorius AG). Thus, an ink 29 was prepared. The content rate of silver particles in the ink was 5.0% by mass.

Ink Preparation Examples 30 to 33

Preparation of Inks 30 to 33

The procedure in Ink Preparation Example 29 was repeated except for changing the amount of the polyester-urethane resin dispersion liquid to 0.34% by mass, 3.33% by mass, 16.70% by mass, and 33.30% by mass, respectively. Thus, inks 30 to 33 were prepared. The pH of each ink at 25° C. is described in Table 10.

Ink Preparation Example 34

Preparation of Ink 34

The procedure in Ink Preparation Example 29 was repeated except for changing the amounts of the polyester-urethane resin dispersion liquid and 1,2-propanediol to 50.00% by mass and 10.0% by mass, respectively. Thus, an ink 34 was prepared. The pH of the ink at 25° C. is described in Table 10.

Ink Preparation Examples 35 to 36

Preparation of Inks 35 and 36

The procedure in Ink Preparation Example 29 was repeated except for replacing the 0.2% by mass of 2-amino-2-hydroxymethyl-1,3-propanediol (available from Tokyo Chemical Industry Co., Ltd.) with 0.15% by mass of triethylamine (available from Tokyo Chemical Industry Co., Ltd.) and changing the amount of the polyester-urethane resin dispersion liquid to 0.00% by mass and 0.30% by mass, respectively. Thus, inks 35 and 36 were prepared. The pH of each ink at 25° C. is described in Table 10.

Ink Preparation Example 37

Preparation of Ink 37

The procedure in Ink Preparation Example 35 was repeated except for changing the amounts of the polyester-urethane resin dispersion liquid and 1,2-propanediol to 50.3% by mass and 10.0% by mass, respectively. Thus, an ink 37 was prepared. The pH of the ink at 25° C. is described in Table 10.

Examples 33 to 38 and Comparative Examples 23 to 25

An inkjet printer (IPSIO SG 3100 available from Ricoh Co., Ltd.) was filled with each of the inks 29 to 37. A 100% solid image was printed on a 50-mm-square area on the print medium M2 (PLATINUM PHOTO PAPER available from ELECOM CO., LTD.) to obtain a printed matter.

Each printed matter was subjected to the evaluation of rate of change of ink viscosity and rate of change of image clarity in the same manner as in Example 1 and the evaluations of image clarity, b* value, and abrasion resistance in the same manner as in Example 27. The evaluation results are shown in Table 10.

TABLE 10

| | | | Content Rate | | | Evaluation Results | | | | | |
| | | | of Polyester-urethane Resin Dispersion | | Print Layer Average | Rate of Change of Ink | Rate of Change of Image | Image Clarity | | b* Value | | |
| | Ink | Ink pH | Liquid (% by mass) | Print Medium | Thickness (nm) | Viscosity (%) | Clarity (%) | Initial | After Exposure | Initial | After Exposure | Abrasion Resistance |
|---|---|---|---|---|---|---|---|---|---|---|---|---|
| Examples 33 | 29 | 9.6 | 5.00 | M2 | 100 | −0.8 | 4.8 | 42 | 40 | +1.0 | +1.0 | S |
| 34 | 30 | 9.7 | 0.34 | M2 | 160 | −0.7 | 1.8 | 56 | 55 | −0.9 | +1.1 | A |
| 35 | 31 | 9.6 | 3.33 | M2 | 100 | −0.6 | 4.1 | 49 | 47 | +1.2 | +1.6 | S |
| 36 | 32 | 9.5 | 16.70 | M2 | 60 | −0.9 | 4.8 | 21 | 20 | +0.8 | +1.3 | S |
| 37 | 33 | 9.4 | 33.30 | M2 | 80 | +0.1 | 3.3 | 6 | 5.8 | −0.8 | +0.8 | S |
| 38 | 34 | 9.4 | 50.00 | M2 | 150 | −0.4 | 7.4 | 5.4 | 4 | −0.7 | +1.0 | S |
| Comparative Examples 23 | 35 | 9.7 | 0.00 | M2 | 150 | −5.4 | 15.7 | 70 | 59 | +1.2 | +1.6 | B |
| 24 | 36 | 9.7 | 0.30 | M2 | 100 | −5.1 | 10.9 | 64 | 57 | +1.0 | +1.7 | B |
| 25 | 37 | 9.3 | 50.30 | M2 | 80 | −5.1 | 9.5 | 4.2 | 3.8 | +0.1 | +1.0 | S |

Embodiments of the present invention provide, for example, the following (1) to (20).

(1) A printed matter comprising:
a print medium comprising a porous layer having an average pore diameter of from 100 to 400 nm and an average thickness of from 1 to 50 μm; and
a print layer on the print medium, the print layer comprising silver and an aliphatic compound having amino group and hydroxyl group, the print layer having an average thickness of from 50 to 300 nm.

(2) The printed matter of (1), further comprising a resin layer on the print layer.

(3) The printed matter of (2), wherein the resin layer has an average thickness of from 5 to 300 μm.

(4) The printed matter of (1), wherein the silver has a number average particle diameter of from 15 to 100 nm.

(5) The printed matter of (4), wherein the silver has a number average particle diameter of from 30 to 60 nm.

(6) The printed matter of (1), wherein the print layer further comprises a resin.

(7) The printed matter of (6), wherein the resin accounts for 0.2% to 50.0% by mass of the print layer.

(8) The printed matter of (7), wherein the resin accounts for 1.0% to 10.0% by mass of the print layer.

(9) A printer comprising:
a print medium comprising a porous layer having an average pore diameter of from 100 to 400 nm and an average thickness of from 1 to 50 μm;
an ink comprising silver particles and an aliphatic compound having amino group and hydroxyl group; and
a print layer former configured to apply the ink onto the print medium to form a print layer thereon.

(10) The printer of (9), wherein the silver particles account for 1.0% to 15.0% by mass of the ink, and the ink has a pH of from 7.0 to 10.0 at 25° C.

(11) The printer of (10), wherein the silver particles account for 2.5% to 10% by mass of the ink.

(12) The printer of (9), wherein the porous layer has an average pore diameter of from 150 to 300 nm.

(13) The printer of (9). wherein the porous layer has an average thickness of from 5 to 30 μm.

(14) The printer of (9), wherein the print layer comprises silver and the aliphatic compound having amino group and hydroxyl group.

(15) The printer of (9), further comprising a resin coater configured to form a resin layer on the print layer.

(16) A set comprising:
a print medium comprising a porous layer having an average pore diameter of from 100 to 400 nm and an average thickness of from 1 to 50 μm; and
an ink comprising silver particles and an aliphatic compound having amino group and hydroxyl group.

(17) The set of (16), wherein the silver particles account for 1.0% to 15.0% by mass of the ink, and the ink has a pH of from 7.0 to 10.0 at 25° C.

(18) The set of (16), wherein the silver particles has a number average particle diameter of from 30 to 60 nm.

(19) A printing method comprising:
forming a print layer having an average thickness of from 50 to 300 nm on a print medium with an ink to form a printed matter,
wherein the print medium comprises a porous layer having an average pore diameter of from 100 to 400 nm and an average thickness of from 1 to 50 μm,
wherein the ink comprises silver particles and an aliphatic compound having amino group and hydroxyl group.

(20) The printing method of (19), wherein the silver particles account for 1.0% to 15.0% by mass of the ink, and the ink has a pH of from 7.0 to 10.0 at 25° C.

The printed matter of (1) to (8), the printers of (9) to (15), the sets of (16) to (18), and the printing methods of (19) and (20) solve the above-described problem and achieve the present invention.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A printed matter comprising:
a print medium comprising a porous layer having an average pore diameter of from 100 to 400 nm and an average thickness of from 1 to 50 μm; and
a print layer on the print medium, the print layer comprising silver and an aliphatic compound having amino group and hydroxyl group, the print layer having an average thickness of from 50 to 300 nm.

2. The printed matter of claim 1, further comprising a resin layer on the print layer.

3. The printed matter of claim 2, wherein the resin layer has an average thickness of from 5 to 300 μm.

4. The printed matter of claim 1, wherein the silver has a number average particle diameter of from 15 to 100 nm.

5. The printed matter of claim 4, wherein the silver has a number average particle diameter of from 30 to 60 nm.

6. The printed matter of claim 1, wherein the print layer further comprises a resin.

7. The printed matter of claim 6, wherein the resin accounts for 1.0% to 10.0% by mass of the print layer.

8. A printer comprising:
a print medium comprising a porous layer having an average pore diameter of from 100 to 400 nm and an average thickness of from 1 to 50 μm;
an ink comprising silver particles and an aliphatic compound having amino group and hydroxyl group; and
a print layer former configured to apply the ink onto the print medium to form a print layer thereon.

9. The printer of claim 8, wherein the silver particles account for 1.0% to 15.0% by mass of the ink, and the ink has a pH of from 7.0 to 10.0 at 25° C.

10. The printer of claim 9, wherein the silver particles account for 2.5% to 10% by mass of the ink.

11. The printer of claim 8, wherein the porous layer has an average pore diameter of from 150 to 300 nm.

12. The printer of claim 8, wherein the porous layer has an average thickness of from 5 to 30 μm.

13. The printer of claim 8, wherein the print layer comprises silver and the aliphatic compound having amino group and hydroxyl group.

14. The printer of claim 8, further comprising a resin coater configured to form a resin layer on the print layer.

15. A printing method comprising:
forming a print layer having an average thickness of from 50 to 300 nm on a print medium with an ink to form a printed matter,
wherein the print medium comprises a porous layer having an average pore diameter of from 100 to 400 nm and an average thickness of from 1 to 50 μm,
wherein the ink comprises silver particles and an aliphatic compound having amino group and hydroxyl group.

16. The printing method of claim 15, wherein the silver particles account for 1.0% to 15.0% by mass of the ink, and the ink has a pH of from 7.0 to 10.0 at 25° C.

* * * * *